Figures 1, 2:
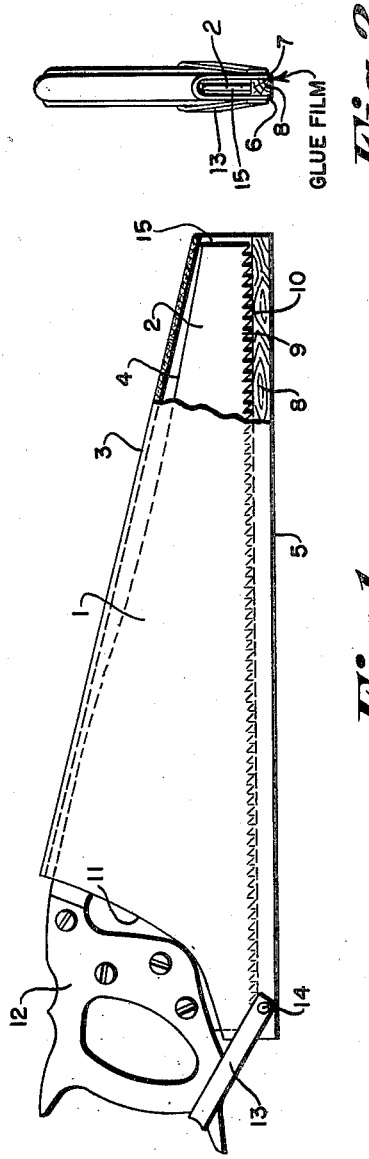

July 10, 1951 T. E. CARR 2,560,383
SAW PACKAGE
Filed Aug. 28, 1946

Inventor
*Thomas E. Carr*
By *Mason Fenwick & Lawrence*
Attorneys

Patented July 10, 1951

2,560,383

UNITED STATES PATENT OFFICE 2,560,383

SAW PACKAGE

Thomas E. Carr, Garden City, Tex.

Application August 28, 1946, Serial No. 693,489

1 Claim. (Cl. 206—46)

This invention relates to a protective device for tools such as saws.

An object of this invention is to provide a device for preventing injury to the toothed cutting edge of tools such as saws.

Another object is to provide a protective device which engages the teeth of saws firmly yet without damage to the sharp cutting edges of said teeth.

Still another object is to provide a protective device for saws which may be firmly secured to said tools in such a manner that it will not readily slip off.

Still another object is to provide a protective device for saws which possesses sufficient rigidity to permit it to be superimposed on said tool quickly and easily.

It is still a further object to provide a protective device for saws which may be manufactured of inexpensive materials.

Further objects of my invention will become evident from the description and drawings.

Figure 1 of the drawings is a side elevational view with a portion cut away, showing my protective device encasing a saw.

Figure 2 is an end view of said device.

It is well known that the teeth of a saw, if unprotected, may be blunted or otherwise damaged by friction with hard objects such as other tools. Furthermore the sharp teeth may cause injury to persons and to objects. These difficulties may be avoided by sheathing the saw in a protective casing and such devices have been devised.

However even in a protective device, the delicate cutting edge of the teeth of a saw may be damaged if the tool is left free to shift within said device. Furthermore, unless the protective casing is made of a tough, costly material, the sharp edge of the tool is likely to cut through the casing very quickly.

The protective casing which I have devised engages the teeth of a saw in such a manner that it cannot shift thus preventing blunting of the tool within the casing. The material which engages the teeth though rigid, is sufficiently soft to avoid damage to the cutting edge. Furthermore my device may be manufactured of inexpensive materials and yet be durable. The rigidity of my protective casing permits it to be slipped easily and quickly over the tool.

Still a further advantage of my protective device is the fact that it is secured to the tool in such a way that it cannot slip off unless the securing means is disengaged but nevertheless leaves the handle of the tool free so that the tool can be picked up and handled by the user in the customary manner. These advantages and others will become obvious from the following description.

Referring to the drawings, the body 1 of the casing is shaped to fit the contour of the tool 2 and may be constructed of cardboard, paper, light wood or suitable plastic materials. Preferably said body is formed as shown in the drawing from a single blank folded upon itself along a line which becomes lateral edge 3 of the casing against which is disposed the back or noncutting edge 4 of the tool. Lateral edge 5 of the casing is formed by securing adhesively or by other suitable means the free edges 6 and 7 of the folded body blank to the sides of a thin narrow strip 8 made of a rigid fibrous material such as soft wood as shown in Figure 2. Thus the teeth 9 of the sawing tool are disposed against the free edge 10 of said rigid strip. The strip, which is preferably made of white pine or similar soft wood, grips the teeth in such a manner that the tool does not readily shift within the casing. At the same time since the wood is soft, it will not cause blunting of the cutting edge. The wood strip also gives rigidity to the casing so that it can be handled easily. Such a strip furthermore is inexpensive and will not be readily worn through by the sharp cutting edge of the tool.

The upper back portion of the casing is cut away forming arcuate edge 11. The recess thus formed leaves the handle 12 of the tool uncovered by the casing. Tapered end 15 is open.

The protective casing is secured to the tool by means of band 13 which loops over the tool handle. The ends of the loop, which are preferably elastic in nature and made of rubber or other similar material, are fastened to the casing through the wood strip by means of a rivet 14 or by other suitable means. This loop holds the casing securely to the tool but permits the user to hold the tool by the handle in the customary fashion.

If desired, printed matter, such as advertisements or rules for manipulating the tool, may be applied to the outside of the casing.

It is obvious that my protective device may be made to fit a saw of any shape or size.

Although the foregoing description discloses preferred and practical embodiments of my invention, it will be obvious to those skilled in the art that modifications may be made which will not transcend the scope of the appended claim.

What I claim is:

A package comprising a saw case and a saw therein, said saw case comprising a body having flat, parallel slightly spaced, forwardly tapered side walls forming a flat saw-receiving slot, closed at both lateral edges and open at both ends, the closure of one of said lateral edges comprising a longitudinally disposed strip of a rigid, fibrous material engaging the teeth of the saw sheathed in said case, and an elastic loop secured by both ends to said case at its larger end, said loop being of such a length as to engage the handle of the saw under tension for constantly urging the teeth of said saw into fixed engagement with said fibrous strip.

THOMAS E. CARR.

REFERENCES CITED

The following references are of record in the file of this patent:

UNITED STATES PATENTS

| Number | Name | Date |
|---|---|---|
| 292,369 | Schluchtner | Jan. 22, 1884 |
| 757,740 | Happe | Apr. 19, 1904 |
| 925,244 | Stevenson | June 15, 1909 |
| 1,157,733 | Stevenson | Oct. 26, 1915 |